US008098136B2

(12) United States Patent  
Ravi et al.

(10) Patent No.: US 8,098,136 B2  
(45) Date of Patent: Jan. 17, 2012

(54) INTEGRATED SWITCH SYSTEMS AND METHODS FOR LOCATING IDENTIFICATION TAGS

(75) Inventors: Ranjith Ravi, San Jose, CA (US); Saurabh Bhargava, San Jose, CA (US); Shilpa Moghe, San Jose, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 871 days.

(21) Appl. No.: 12/146,217

(22) Filed: Jun. 25, 2008

(65) Prior Publication Data

US 2009/0322536 A1  Dec. 31, 2009

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08B 23/00 | (2006.01) |
| G08C 19/00 | (2006.01) |
| G06Q 10/00 | (2006.01) |
| H04B 1/38 | (2006.01) |
| H04Q 1/00 | (2006.01) |
| H04Q 5/22 | (2006.01) |

(52) U.S. Cl. ............... 340/10.4; 340/572.1; 340/10.1; 340/5.61; 705/28

(58) Field of Classification Search ............... 340/572.1, 340/10.1, 10.4, 5.61; 705/28

See application file for complete search history.

(56) References Cited

U.S. PATENT DOCUMENTS

| 7,030,761 | B2 | 4/2006 | Bridgelall et al. | |
|---|---|---|---|---|
| 2004/0078151 | A1* | 4/2004 | Aljadeff et al. | 702/40 |
| 2005/0092825 | A1* | 5/2005 | Cox et al. | 235/375 |
| 2006/0143439 | A1* | 6/2006 | Arumugam et al. | 713/153 |
| 2006/0145813 | A1* | 7/2006 | Haller et al. | 340/10.1 |
| 2007/0188342 | A1 | 8/2007 | Valeriano et al. | |
| 2007/0229217 | A1* | 10/2007 | Chen et al. | 340/5.61 |
| 2008/0042807 | A1* | 2/2008 | Park et al. | 340/10.3 |
| 2008/0080550 | A1 | 4/2008 | Malik | |
| 2009/0327102 | A1* | 12/2009 | Maniar et al. | 705/28 |

OTHER PUBLICATIONS

International Search Report and the Written Opinion of the International Searching Authority for International Application No. PCT/US20091045944 mailed Jul. 29, 2009.

* cited by examiner

*Primary Examiner* — Jennifer Mehmood  
*Assistant Examiner* — Andrew Bee

(57) ABSTRACT

Integrated switch systems and methods for locating ID tags are disclosed. One system includes an application, a plurality of different tag readers in communication with the ID tags, and an integrated switch configured to enable the application to receive tag information from the different tag readers. An integrated switch includes multiple reader adapters, an application adapter, and a virtualization core. The virtualization core is configured to provide a common interface between each tag reader and the application. One method includes receiving a first signal from a first tag reader and receiving a second signal from a second tag reader, the first and second signals having information related to first and second ID tags, respectively. The method also includes normalizing the first and second signals such that the signals are compatible with the application and transmitting an ID tag report based on the normalized first and/or second signal to the application.

4 Claims, 2 Drawing Sheets

INTEGRATED SWITCH SYSTEMS AND METHODS FOR LOCATING IDENTIFICATION TAGS

FIELD OF THE INVENTION

The present invention relates generally to identification (ID) systems, wireless local area networks (WLANs), and other such networks incorporating ID tags, and, more particularly, to integrated switch systems for use with multiple ID tag technologies and methods for locating ID tags.

BACKGROUND OF THE INVENTION

In recent years, wireless identification (ID) systems have achieved wide popularity in a number of applications, as they provide a cost-effective way to track the location, number, type, status, etc. of assets or individuals in real time. Some large-scale environments (e.g., warehouses, retail spaces, and the like) use different types of ID tags (e.g., active RFID tags, passive RFID tags, semi-active RFID tags, WiFi tags, WiMAX tags, ultra wideband (UWB) tags, 802.11 tags, Zigbee tags, and the like tags) for tracking each category of asset and/or individual. For example, an active RFID tag may be used to track non-mobile assets and a passive RFID tag may be used to track mobile assets. In another example, a first tag type may be used to track the quantity and location of assets, and a second tag type may be used to track the quantity and location of individuals.

With this said, an environment using multiple tag technologies will typically also include a corresponding tag reader for each technology type (and manufacturer) of ID tag. In other words, multiple tag readers may be distributed throughout the environment in the form of, for example, entryway readers, conveyer-belt readers, mobile readers, etc., and may be linked by network controller switches and the like.

In addition, because there may be many different ID tag technologies used in a particular environment, multiple location and/or ID technologies are also typically needed to support the various types of ID tags and tag readers. For example, a particular environment may use dual-mode (e.g., an integrated WiFi/RFID tag) or multi-mode ID tags in order to take advantage of all possible locationing technologies available and/or to improve accuracy in tracking assets or individuals, which scenario would also likely include a corresponding number of tag reader technologies.

With an increase in use of multiple ID tag technologies in the same environment comes a need for integrated switch systems that are capable of enabling one or more applications to operate with each of the employed technologies and method for locating ID tags. Accordingly, it is desirable to provide integrated switches for use with multiple ID tag technologies and methods for locating ID tags. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Systems for locating ID (ID) tags are provided. One exemplary system comprises an application, a plurality of different tag readers in communication with the ID tags, and an integrated switch coupled to the application and the plurality of different tag readers. The integrated switch is configured to enable the application to receive tag information from the plurality of different tag readers.

Also provided are integrated switches configured to transmit signals between a plurality of different tag readers and one or more applications. An exemplary integrated switch comprises a plurality of reader adapters configured to be coupled to the plurality of tag readers, one or more application adapters configured to be coupled to the application(s), and a virtualization core coupled to each reader adapter and the application adapter(s). The virtualization core is configured to provide a common interface between each tag reader and the application(s).

Methods for locating different types of ID tags using an integrated switch in communication with an application and a plurality of different tag readers in communication with the ID tags are also provided. One exemplary method comprises the steps of receiving a first signal from a first tag reader, the first signal having information related to a first ID tag and intended for transmittal to the application, and normalizing the first signal such that the first signal is compatible with the application. The method also comprises the steps of receiving a second signal from a second tag reader, the second signal having information related to a second ID tag and intended for transmittal to the application, and normalizing the second signal such that the second signal is compatible with the application. The method further comprises the step of transmitting the normalized first signal and the normalized second signal to the application.

BRIEF DESCRIPTION OF THE DRAWINGS

The present invention will hereinafter be described in conjunction with the following drawing figure.

DETAILED DESCRIPTION OF THE INVENTION

Figure 1:
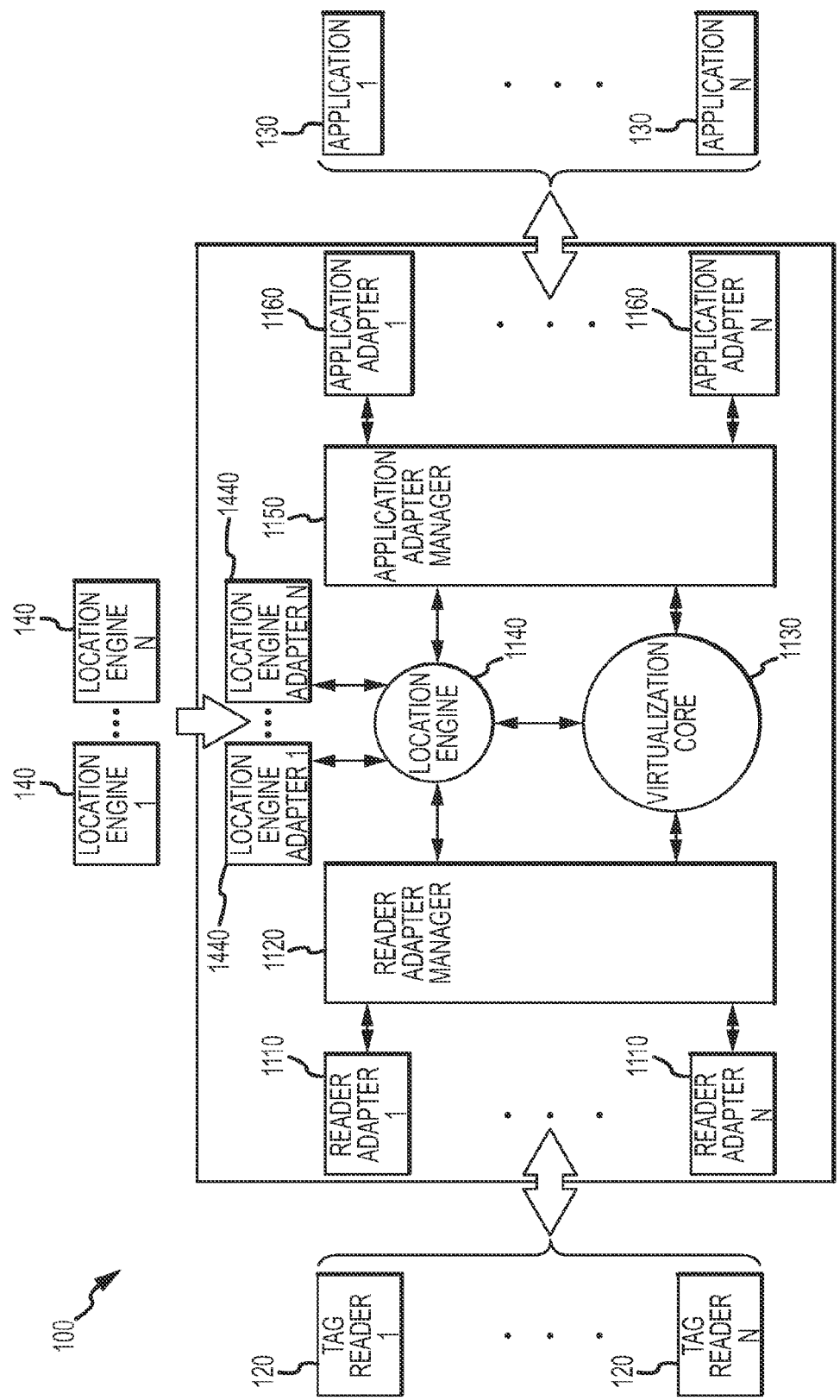
FIG. 1 is a schematic diagram of one exemplary embodiment of a system for determining the location of an RFID tag.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention relates to systems and methods for determining the location of an identification (ID) tag. In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, ultra wideband (UWB) systems and specifications, the WiFi and WiMAX systems and specifications, and other functional aspects of the systems (and the individual operating components of the systems) may not be described in detail herein. Furthermore, the connecting lines shown in the figure contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figure may depict example arrangements of elements, additional intervening elements, devices, features, or components may be present in an embodiment of the invention.

Referring now to the figures, FIG. 1 is a diagram of one exemplary embodiment of a system 100 for determining the location of a tag. In the illustrated embodiment, system 100 includes an integrated switch 110 coupled to multiple tag readers 120, one or more applications 130, and one or more location engines 140 that are external to integrated switch 110.

Integrated switch 110 includes multiple reader adapters 1110 that are each capable of coupling integrated switch 110 to a corresponding one or more of tag readers 120. Reader adapters 1110 are suitably configured to enable integrated switch 110 to interface with multiple technology types of tag readers 120 and receive ID tag information from each tag reader 120. That is, reader adapters 1110 are capable of enabling integrated switch 110 to interface with two or more tag readers 120 using different signaling technologies (i.e., interface with two or more of an active RFID tag reader, a passive RFID tag reader, a semi-active RFID tag reader, a WiFi tag reader, a WiMAX tag reader, an UWB tag reader, an 802.11 tag reader, an a Zigbee tag reader).

Furthermore, reader adapters 1110 enable integrated switch 110 to interface with different types of devices including, for example, ultra wide band sensors, cellular sensors, ID tags, and the like devices. These devices, along with tag readers 120, are controlled by integrated switch 110 using various commands. In one embodiment, reader adapters 1110 are Adaptive Reader Programming Interface (ARPI) adapters. In this embodiment, reader adapters 1110 are configured to provide an abstract view of tag readers 120 (and their respective ID tags) such that application(s) 130 do not need to be aware of the ID tag technology being processed. That is, ARPI adapters enable integrated switch 110 to intermingle different ID tag technologies (including different manufacturers) for transmittal to one or more of applications 130.

Furthermore, ARPI adapters enable system 100 to add additional ID tag technologies by writing a new reader adapter 1110 and making the new reader adapter 1110 available to the added tag reader 120 on integrated switch 110. For example, to add support for a new UWB tag reader 120 (and UWB ID tags), a UWB reader adapter 1110 may be written on integrated switch 110; after which, the location information for the UWB tags becomes available to integrated switch 110 (and thus application(s) 130) via the UWB tag reader 120/UWB reader adapter 1110 coupling.

Integrated switch 110 also includes a reader adapter manager 1120 coupled to each reader adapter 1110, a virtualization core 1130, and a location engine 1140. Reader adapter manager 1120 is configured to manage the flow of data (e.g., ID tag information) between reader adapters 1110 and virtualization core 1130 and/or location engine 1140.

Virtualization core 1130 may be any module, software, device, or combinations thereof capable of altering one or more properties of a received signal. In one embodiment, virtualization core 1130 is configured to normalize signals received from tag readers 120 such that one or more applications 130 are compatible with the signals. In one embodiment, location engine 1140 is configured to determine the location of an ID tag based, at least in part, on location data received from the ID tag itself (via a tag reader 120). In another embodiment, location engine 1140 is configured to determine the location of an ID tag using location data obtained, at least in part, from one or more of tag readers 120. In yet another embodiment, location engine 1140 is configured to determine the location of an ID tag based, at least in part, using location data obtained from one or more of location engines 140. That is, location engine 1140 is configured to determine the location of ID tags using location data obtained from an ID tag, a tag reader 120, and/or a location engine 140 that is external to integrated switch 110.

Location engine(s) 140 may be any hardware, device, and/or system capable of determining the location of an ID tag. Examples of location engines 140 include, but are not limited to, time difference of arrival (TDOA) locationing devices, Bluetooth® locationing devices, active RFID locationing devices, RF modeling locationing devices (e.g., locationing devices manufactured by Ekahau, Inc. of Reston, Va.), locationing appliances manufactured by Newbury Networks, Inc. of Boston, Mass., and the like locationing devices.

To interface with one or more of location engines 140, integrated switch 110 comprises a corresponding number of location engine adapters 1440. Location engine adapters 1440 may be any hardware, device, and/or system capable of enabling integrated switch 110 to communicate with location engines 140.

Integrated switch 110 also comprises an application adapter manager 1150 coupled to location engine 1140 and/or virtualization core 1130. Application adapter manager 1150 is configured to manage the flow of data (e.g., ID tag information) between application adapters 1160 and virtualization core 1130 and/or location engine 1140.

Application adapters 1160 are each capable of coupling integrated switch 110 to a corresponding one or more of applications 130. Applications adapters 1160 are suitably configured to enable integrated switch 110 to interface with multiple technology types of applications 130 and transmit ID tag information from integrated switch 110 to one or more of applications 130. That is, application adapters 1160 are capable of enabling integrated switch 110 to interface with two or more applications 130.

In one embodiment, application adapters 1160 are Enterprise Services Programming Interface (ESPI) adapters that provide different interfaces for applications 130 to interact with integrated switch 110. As applications 130 typically each use only one ESPI, new ID tag technologies can be deployed or the current infrastructure of system 100 can be modified without impacting or necessitating any change in an application 130. That is, as there could be more than one standard interface for application interaction, or applications 130 may be pre-developed with no interest in changing these applications, new ESPI adapters 1160 can be written and uploaded on integrated switch 110 to provide a new interface on integrated switch 110 to interact with applications 130.

Applications 130 may be any hardware, device, and/or system capable of storing data related to an environment employing ID tags and informing integrated switch 110 when, what, and/or how many ID tags is or becomes detectable in the environment. Specifically, applications 130 are configured to store and transmit data to integrated switch 110 related to a map of the environment, the infrastructure of the environment, data related to predetermined zones (e.g., areas of interest with respect to whenever an asset becomes "visible" or "invisible") within the environment, location specifications (e.g., autonomous, periodic, asset ID marks, etc.), and the like data.

Applications 130 and integrated switch 110 may communicate using any technology interface. In one embodiment, applications 130 and integrated switch 110 communicate using an application level event (ALE) interface.

The following discussion of the operation of the illustrated embodiment of system 100 may be helpful in understand system 100. When application 130 requests location information from an ID tag, integrated switch 110 activates the desired ARPI adapter(s) 1110. The activated ARPI adapter(s) encapsulate all the details about the operation of the ID tag via one or more tag readers 120 in communication with the ID tag. The raw ID tag data (e.g., location information) is then reported by ARPI adapter(s) 1110 to ARPI manager 1120. If the ID tag is capable of reporting its location (e.g., x, y, z coordinates), integrated switch 110 directly passes this tag data to the requesting application 130.

If the ID tag is not able to provide its location, location engine 1140 may calculate the ID tag location using the information provided by tag readers 120 (e.g., using signal strength information). In situations where tag readers 120 are not capable of providing the ID tag data, location engine 1140 requests informs location engine(s) 1440 of the presence of the ID tag and receives location data from location engines(s) 1440. In these situations, location engine 1140 provides location granularity for the ID tag and, in situations where more information is available, may also receive the coordinate information from the ID tag itself, tag readers 120, and/or location engine(s) 140.

Figure 2:
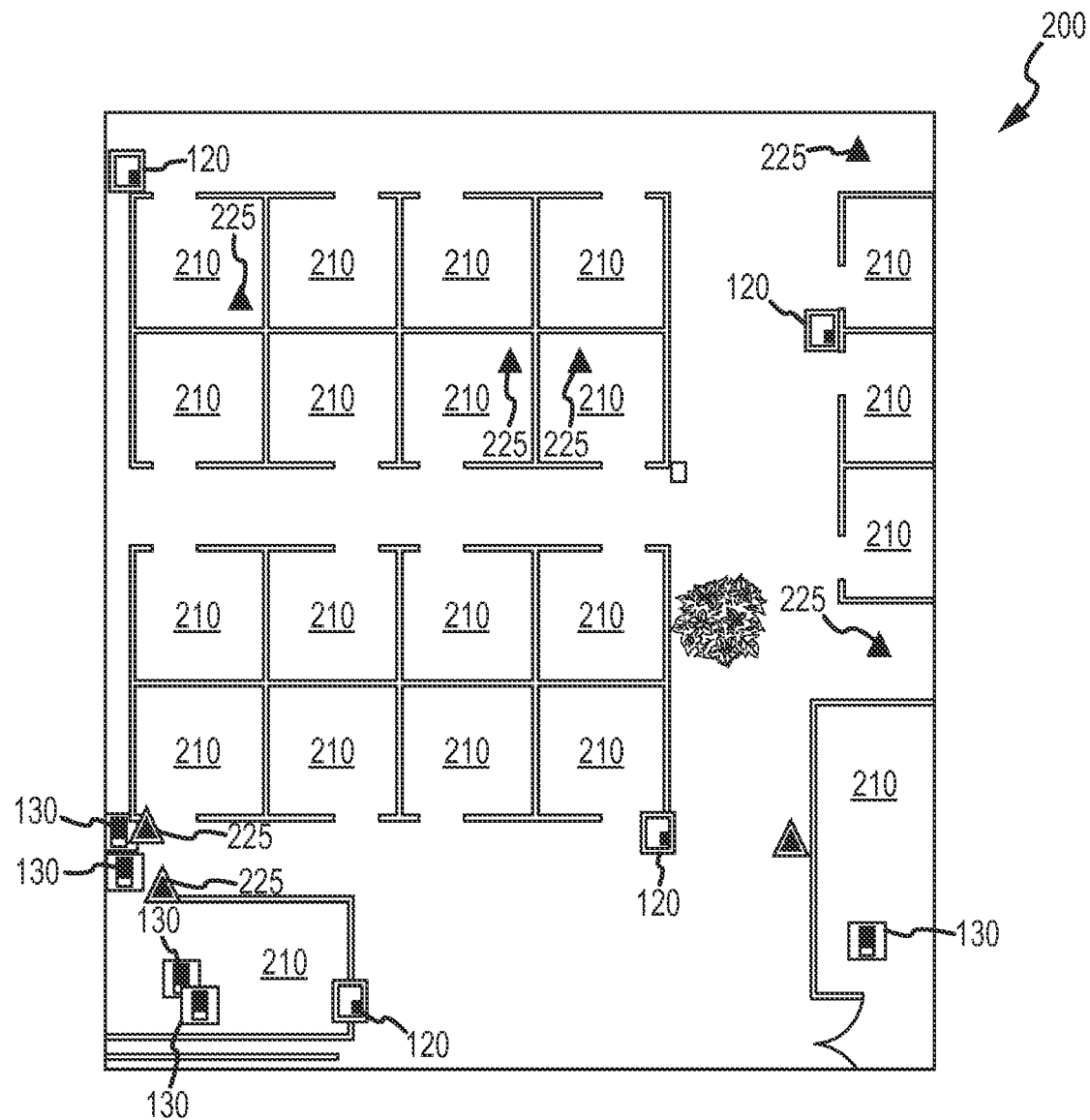
FIG. 2 is a schematic diagram of an environment incorporating the system of FIG. 1.

FIG. 2 is a schematic diagram of an environment 200 incorporating system 100 discussed above with reference to FIG. 1. In the illustrated embodiment, environment 200 is divided into a plurality of zones 210, which may be defined as, for example, a polygon or other shape.

Each zone 210 may have any size and/or arbitrary geometric shape, and may comprise multiple topologically unconnected spaces, and need not encompass the entirety of environment 200. Furthermore, although the present invention is illustrated in two-dimensions, each zone 210 may be extended to three-dimensional spaces as well.

As illustrated, zones 210 are plotted onto a map of environment 200, which map is stored in one or more of applications 130. Likewise, any obstacles (e.g., a pillar, wall, equipment, inventory, etc.) that may be present within environment 200 are plotted onto the map of environment 200.

Application(s) 130 then transmit the map of environment 200, including the location of any ID tags 225, tag readers 120, and obstacle(s) with respect to zones 210, to integrated switch 110.

In one embodiment, zones 210 are defined by a site planning tool that enables a user to graphically create a zone 210 and save the zone 210 as a portion of the map of environment 200. In another embodiment, integrated switch 110 creates zones 210 by defining points on the perimeter of each zone 210, and applications 130 can then query integrated switch 110 for the definition of each zone 210.

During operation, applications 130 query integrated switch 110 for data related to one or more of zones 210. Integrated switch 110 then communicates requests from applications 130 to the appropriate managed tag reader 120.

When one or more applications 130 request location information from a device or tag reader 120, integrated switch 110 activates the desired reader adapter 1110 to encapsulate all the details about the operation of the device and/or tag reader 120. Raw ID tag data is then received from the device or tag reader 120, and the raw ID tag data is reported by the reader adapter 1110 to reader adapter manager 1120. Reader adapter manager 1120 transmits the raw ID tag data to location engine 1140 (and possibly location engine(s) 140) to determine the location of the ID tag if the location of the ID tag is not included within the raw ID tag data. After the location of the ID tag is determined, the ID tag data is transmitted from location engine 1140 to virtualization core 1130. If the raw ID tag data includes location data, reader adapter manager 1120 transmits the raw ID tag data to virtualization core 1130.

Virtualization core 1130 then aggregates, filters (if needed), and normalizes the ID tag data to generate an ID tag report. The ID tag report may include, for example, an asset ID, a timestamp of when the asset was detected, the location or zone 210 where the asset is located, proprietary data (like temperature, battery life indicator, etc.) related to the asset, and/or the like information related to the asset that is associated with the ID tag. Virtualization core 1130 then transmits the ID tag report to application manager 1150, which then transmits the ID tag report to the appropriate application adapter(s) 1160. Application adapter(s) 1160 then transmit the ID tag report to the one or more applications 130 that requested the information.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A system for locating identification (ID) tags, comprising:
   an application; a plurality of different multiple technology type tag readers in communication with the ID tags using different signaling technologies; and
   an integrated switch coupled to the application and the plurality of different tag readers, the integrated switch including a plurality of reader adapters coupled to the plurality of different tag readers, an application adapter coupled to the application, and a virtualization core coupled to each reader adapter and to the application adapter, wherein the integrated switch is configured to enable the application to receive tag information from the plurality of different tag readers by having the virtualization core normalize the tag information to provide a common interface between each tag reader of a different technology type and the application, and wherein the integrated switch further comprises a location engine coupled to each reader adapter, the application adapter, and the virtualization core, the location engine configured to at least partially determine a location of the ID tags; and wherein the integrated switch is operable to create location zones by defining points on the perimeter of each zone, and the application is operable to query the integrated switch for the definition of each zone.

2. The system of claim 1, wherein the application is further operable to query the integrated switch for data related to a zone, whereupon the integrated switch is then further operable to communicate the query from the application to an appropriate tag reader through the associated reader adapter that is directed to encapsulate the query for the tag reader and any received data from the tag reader.

3. The system of claim 1, wherein the location engine is configured to receive location information for the ID tags from at least one of the group of location data obtained from an ID tag, a tag reader, and another location engine that is external to integrated switch, and combine the location information and the at least partially determined location to determine the location of the ID tags.

4. A method for locating different types of identification (ID) tags using an integrated switch in communication with an application and a plurality of different multiple technology type tag readers that are in communication with the ID tags using different signaling technologies, the method comprising the steps of:

coupling reader adapters between the plurality of different tag readers and the integrated switch, coupling an application adapter between the application and the integrated switch, coupling a virtualization core to each reader adapter and to the application adapter, and coupling a location engine to each reader adapter;

receiving information from the plurality of different tag readers, the information intended for transmittal to the application;

normalizing the tag information by the virtualization core to be compatible with the application to provide a common interface between each tag reader of a different technology type and the application; and partially determining a location of the ID tags by the location engine; and creating location zones by the integrated switch by defining points on the perimeter of each zone, and querying the integrated switch by the application for the definition of each zone.

\* \* \* \* \*

UNITED STATES PATENT AND TRADEMARK OFFICE
CERTIFICATE OF CORRECTION

| | |
|---|---|
| PATENT NO. | : 8,098,136 B2 |
| APPLICATION NO. | : 12/146217 |
| DATED | : January 17, 2012 |
| INVENTOR(S) | : Ravi et al. |

It is certified that error appears in the above-identified patent and that said Letters Patent is hereby corrected as shown below:

On the Title Page, in item (56), under "OTHER PUBLICATIONS", in Column 2, in Line 3, delete "US20091045944" and insert -- US2009/045944 --, therefor.

Signed and Sealed this
Twenty-fifth Day of December, 2012

David J. Kappos
*Director of the United States Patent and Trademark Office*